(12) United States Patent
Lin et al.

(10) Patent No.: US 6,359,718 B1
(45) Date of Patent: Mar. 19, 2002

(54) ACTUATING MECHANISM FOR ROTATING MICRO-MIRROR

(75) Inventors: Hung-Yi Lin, Taipei; Weileun Fang, Hsinchu, both of (TW)

(73) Assignee: Walsin Lihwa Corporation, Taipei (TW)

( * ) Notice: Subject to any disclaimer, the term of this patent is extended or adjusted under 35 U.S.C. 154(b) by 0 days.

(21) Appl. No.: 09/838,061

(22) Filed: Apr. 18, 2001

(30) Foreign Application Priority Data

Feb. 1, 2001 (TW) .......................................... 90102091

(51) Int. Cl.$^7$ .............................................. G02B 26/08
(52) U.S. Cl. ........................ 359/224; 359/223; 359/872
(58) Field of Search ................................. 359/196, 223, 359/224, 872

(56) References Cited

U.S. PATENT DOCUMENTS 5,867,297 A   2/1999  Kiang et al. ................. 359/198
6,201,629 B1 * 3/2001 McClelland et al. ........ 359/223
6,295,154 B1 * 9/2001 Laor et al. ................... 359/224

\* cited by examiner

Primary Examiner—Darren Schuberg (57) ABSTRACT

An actuating mechanism for rotating a micro-mirror is disclosed. The actuating mechanism includes a first linking rod consisting of a first and a second portions, a second linking rod consisting of a third and a fourth portions, a first fulcrum positioned between the first and second portions, and a second fulcrum positioned at one side of the fourth portion opposite to the third portion. The first and third portions are flexibly connected to a shaft that the micro-mirror rotates with, and the second and fourth portions are coupled to respective actuators. When actuating forces are applied to move the second and fourth portions, the first and third portions are levered to rotate the shaft and thus the micro-mirror due to the effect of the fulcrums.

15 Claims, 11 Drawing Sheets

ACTUATING MECHANISM FOR ROTATING MICRO-MIRROR

FIELD OF THE INVENTION

The present invention relates to an actuating mechanism, and more particularly to an actuating mechanism for rotating a micro-mirror in a photoelectric device such as a laser scan display or an optical switch.

BACKGROUND OF THE INVENTION

Figure 1:
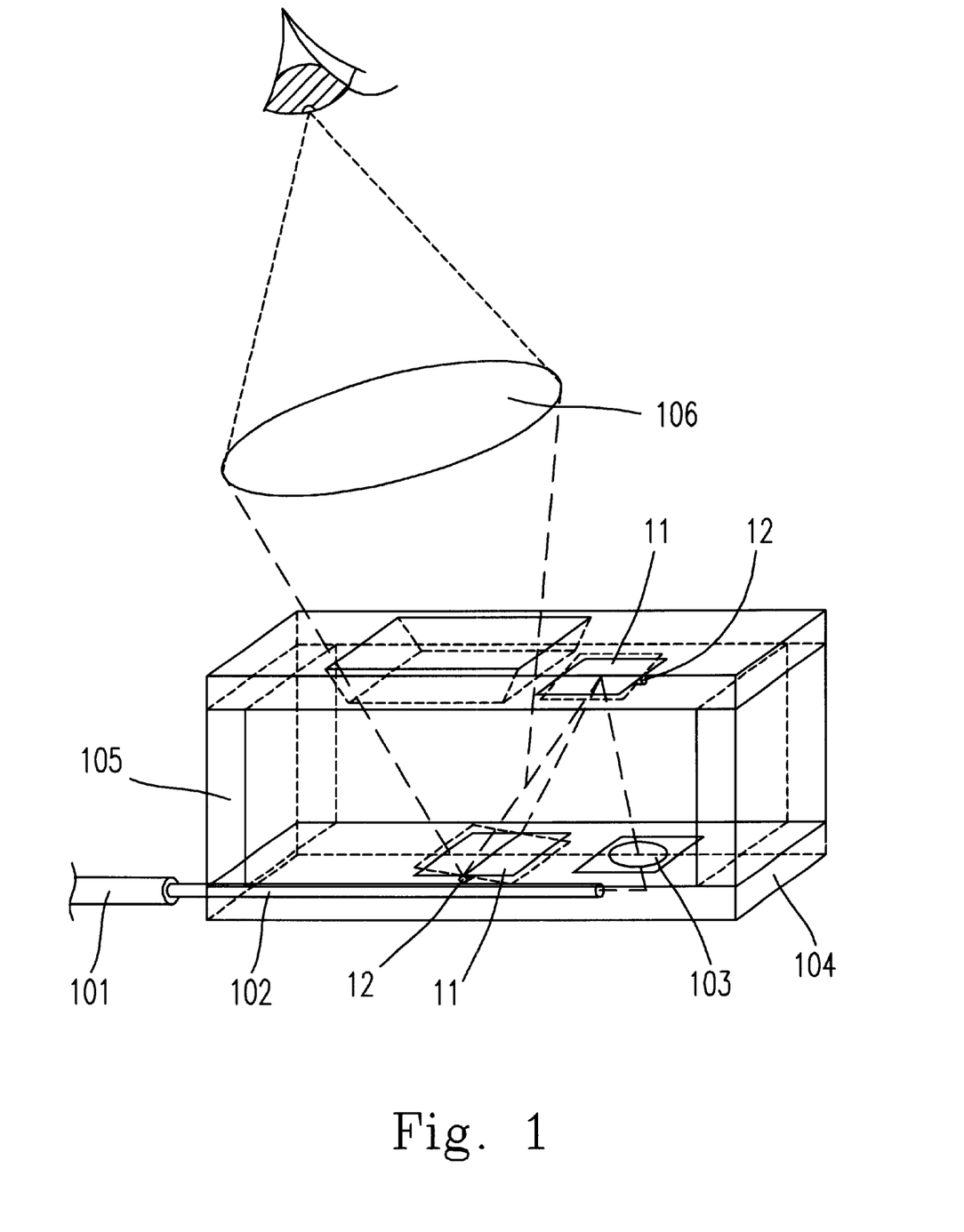
FIG. 1 is a schematic diagram showing a laser scan display which includes micro-mirrors therein.
Figure 2:
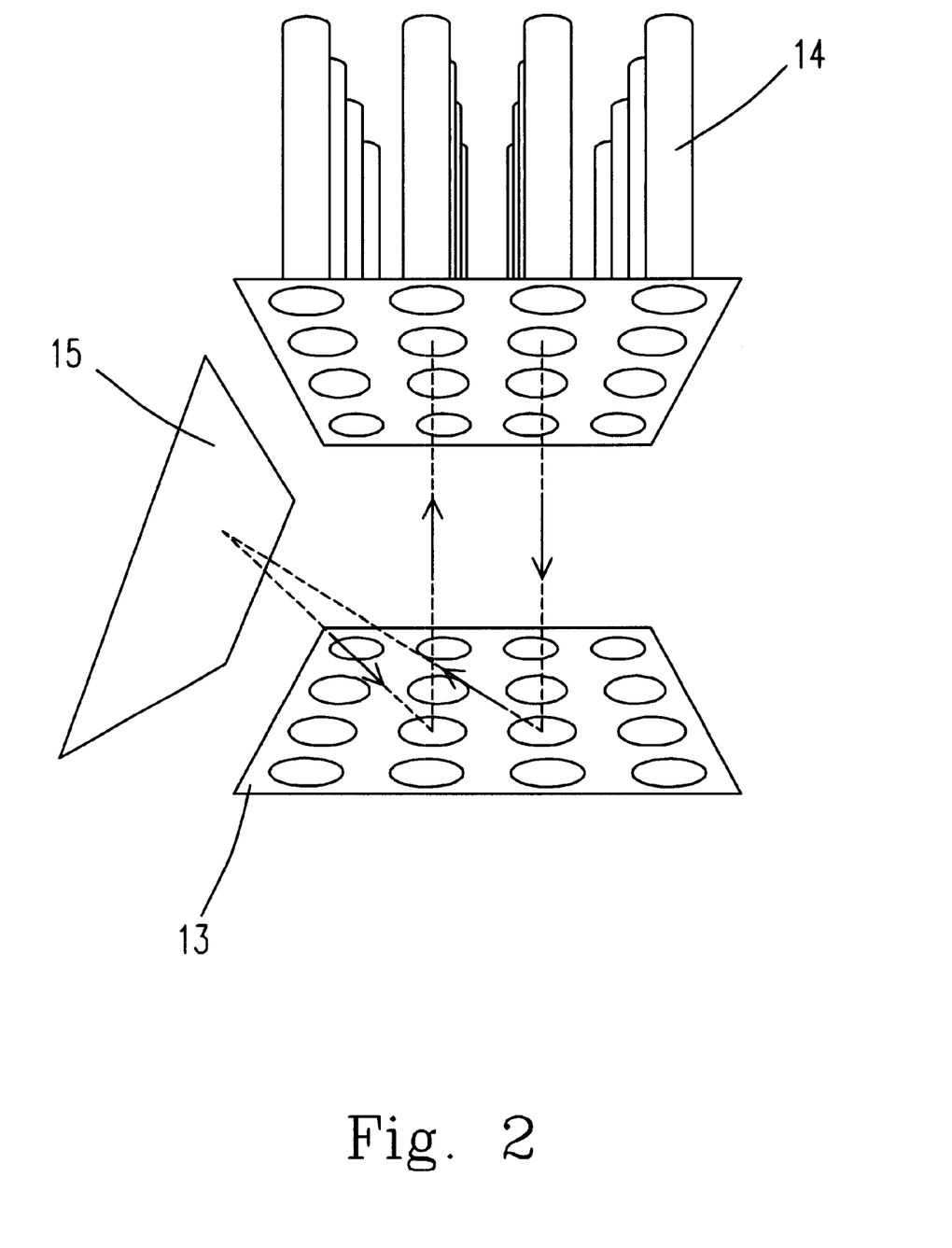
FIG. 2 is a schematic diagram showing a multi-port optical switch which inclines micro-mirrors therein.

Micro-mirrors are more and more popular in photoelectric industry, and become essential for many photoelectric devices. For example, referring to FIG. 1, micro-mirrors 11 are used in a laser scan display, which consists of a laser source 101, an optical wave guide 102, a lens 103, a silicon substrate 104, a support plate 105 and another lens 106, to guide laser beams to the scan points, and actuating devices 12 are used to adjust the rotation angles of the micro-mirrors 11. In another example, a micro-mirror array 13 consisting of plural micro-mirrors and respective actuating devices are used in a multi-port optical switch, which includes plural optical fibers 14 and a reflective mirror 15, to adjust the light directions, as shown in FIG. 2.

Figure 3:
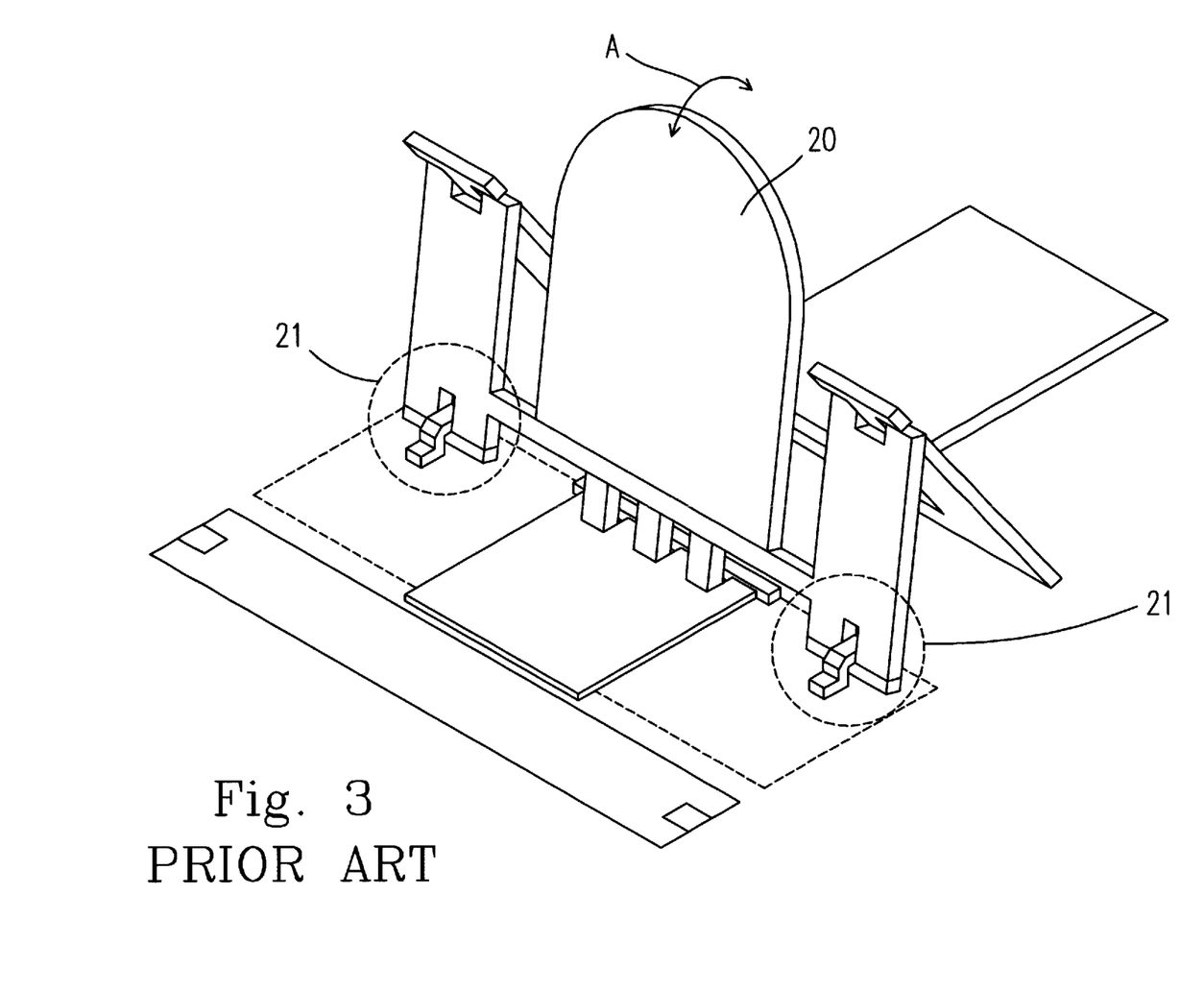
FIG. 3 is a schematic diagram showing a conventional actuating mechanism for rotating a micro-mirror, which is.

U.S. Pat. No. 5,867,297 discloses an actuating mechanism for rotating a micro-mirror, which is as shown in FIG. 3 and incorporated herein for reference. In this actuating mechanism, the assembling operation is complicated, and the micro-hinges 21 are subject to being worn. In addition, the rotation of the mirror 20 is limited to one dimension, as indicated by the arrow A.

Figure 4A:
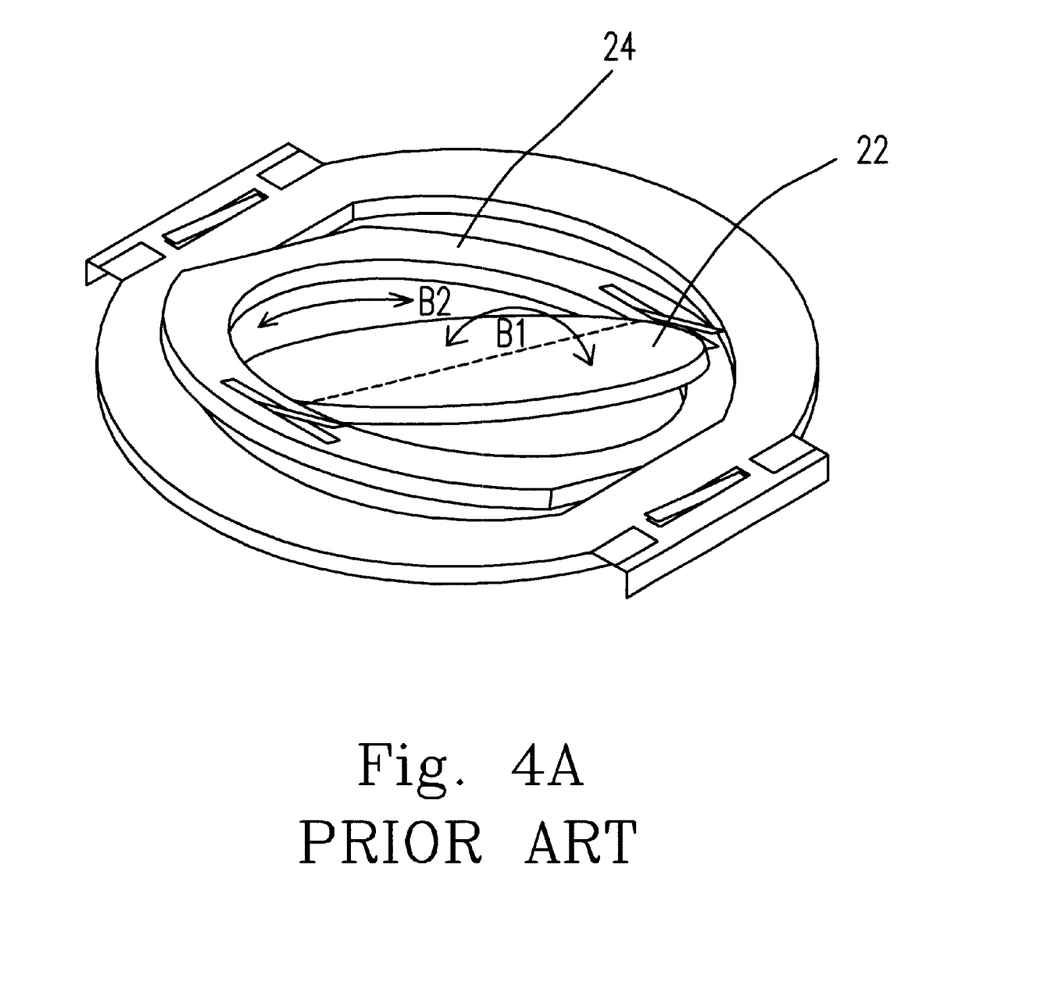
FIG. 4A is a schematic diagram showing another conventional actuating mechanism for rotating a micro-mirror.
Figure 4B:
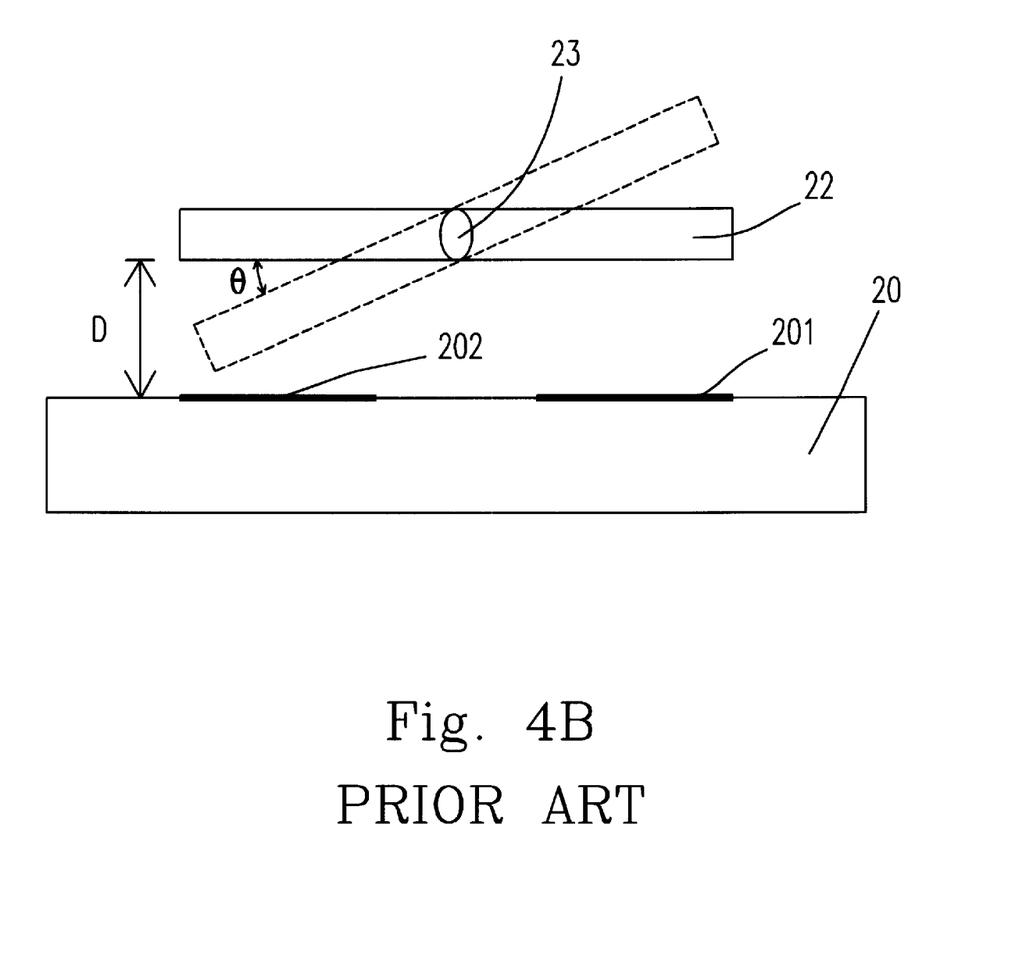
FIG. 4B schematically show the operation of the actuating mechanism of FIG. 4A.

Please refer to FIG. 4A which is a schematic diagram showing another conventional actuating mechanism for rotating a micro-mirror. The micro-mirror 22 itself can be rotated in a first dimension indicated by the arrow A, and can be further rotated in a second dimension indicated by the arrow B with an auxiliary ring 24. When the micro-mirror 22 is rotated in either of the dimensions B1 and B2, the rotation angle is confined within a small range because of the presence of a substrate 20 thereunder. In this conventional actuating mechanism, the micro-mirror 22 itself functions as an electrode which interacts with another electrode 201 or 202 formed on the substrate 20 to control the rotation of the micro-mirror 22, as shown in FIG. 4B. The interaction between the mirror electrode 22 and the electrode 201 or 202 is generated due to the electrostatic force therebetween. As understood, the distance D between the two electrodes 22 and 201/202 should be small enough to generate a sufficient electrostatic force to rotate the micro-mirror 22 about the pivot 23. Accordingly, the angle range θ will be limited.

Further, owing to the frequent rotation, it is possible for the micro-mirror to be distorted by the actuating force so that the reflection function of the mirror may be adversely effected.

SUMMARY OF THE INVENTION

Therefore, an object of the present invention is to provide an actuating mechanism for rotating a micro-mirror within a relatively large angle range.

Another object of the present invention is to provide an actuating mechanism for rotating a micro-mirror, in which the micro-mirror is strengthened with a grid ring.

According to a first aspect of the present invention, an actuating mechanism for rotating a micro-mirror includes a substrate formed thereon a first recess region; a shaft secured to the micro-mirror for rotating the micro-mirror therewith in the first recess region; a first actuator mounted on the substrate beside the first recess region for providing a first actuating force; a first linking rod device including a first linking rod and a first fulcrum positioned between a first and a second portions of the first linking rod, the first portion being flexibly connected to the shaft, and the second portion being coupled to the first actuator; a second actuator mounted on the substrate beside the first recess region opposite to the first actuator for providing a second actuating force; and a second linking rod device including a second linking rod and a second fulcrum positioned at one end of the second linking rod, the second linking rod including a third portion flexibly connected to the shaft, and a fourth portion coupled to the second actuator; wherein the second and fourth portions are moved in response to the first and second actuating forces to lever the first and third portions via the first and second fulcrums, respectively, thereby rotating the shaft.

In an embodiment, the substrate is a silicon substrate, and the first and second linking rods are made of low stress silicon nitride.

In an embodiment, the first actuator includes a bottom electrode formed on the substrate; a top electrode connected to the second portion of the first linking rod, and formed above the bottom electrode with a gap therebetween; and a power source connected to the bottom and top electrodes for providing a potential difference in order to generate an electrostatic force between the bottom and top electrodes, thereby controlling the size of the gap, and moving the second portion of the first linking rod.

Preferably, the bottom electrode is formed of a doped semiconductor material, and the top electrode is formed of a material selected from a group consisting of aluminum, platinum and gold. More preferably, the first actuator further includes an insulating structure between the bottom and top electrodes.

Similarly, the second actuator may includes a bottom electrode formed on the substrate; a top electrode connected to the fourth portion of the second linking rod, and formed above the bottom electrode with a gap therebetween; and a power source connected to the bottom and top electrodes for providing a potential difference in order to generate an electrostatic force between the bottom and top electrodes, thereby controlling the size of the gap, and moving the fourth portion of the second linking rod. The bottom electrode is formed of a doped semiconductor material, the top electrode is formed of a material selected from a group consisting of aluminum, platinum and gold, and the second actuator further includes an insulating structure between the bottom and top electrodes.

Preferably, the substrate is further formed thereon a second recess region for providing a movement space for the first and second linking rods.

Preferably, the shaft is coupled to both of the first portion of the first linking rod and the third portion of the second linking rod via a coupler.

The actuating mechanism according to the present invention is suitable for rotating a micro-mirror made of aluminum. The micro-mirror is preferably strengthened by providing therearoud a grid ring to prevent from distortion due to the actuating forces.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 5A:
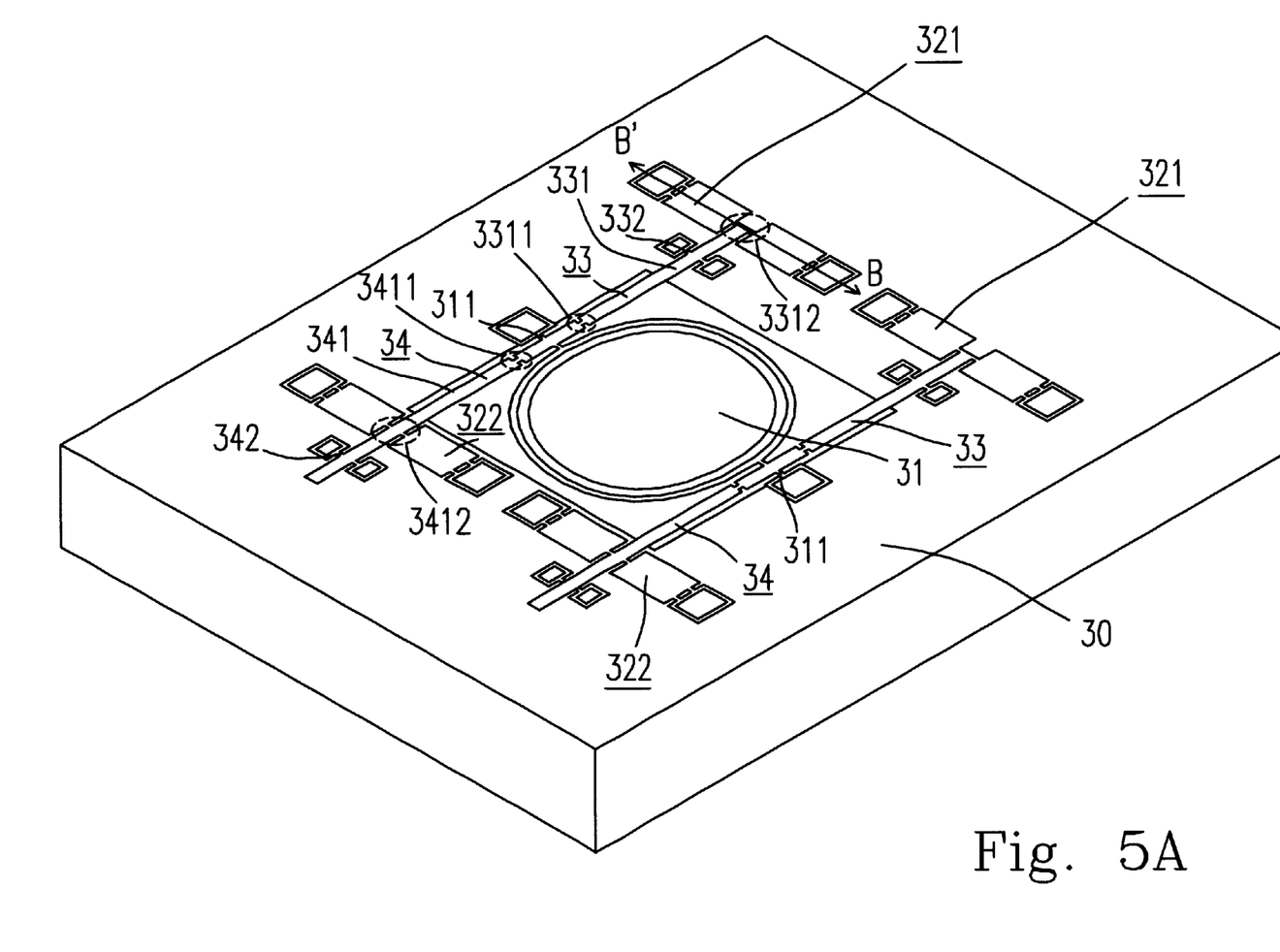
FIG. 5A is a schematic diagram showing a preferred embodiment of an actuating mechanism according to the present invention.

Please refer to FIGS. 5A~5D which schematically show a preferred embodiment of an actuating mechanism according to the present invention. As shown in FIG. 5A, the actuating mechanism includes a silicon substrate 30, a first linking rod 331 consisting a first portion 3311 and a second portion 3312, a first fulcrum 332 positioned between the first and second portions 3311 and 3312, a second linking rod 341 consisting of a third portion 3411 and a fourth portion 3412, a second fulcrum 342 positioned at one end of the second linking rod 341, a first actuator 321 coupled to the second portion 3312, a second actuator 322 coupled to the fourth portion 3412, a shaft 311 secured to a micro-mirror 31 to be rotated, and a coupler 3111 connected to the shaft 311, the first portion 3311 and the third portion 3411. On the substrate 30, a first recess region 301 is formed to provide a rotation space for the micro-mirror 31, and the actuators 321 and 322 are formed beside the first recess region 301 and opposite to each other. In addition, a second recess region 302 (FIG. 5C or 5D) is formed to provide a movement space for the linking rods 331 and 341.

Figure 5B:
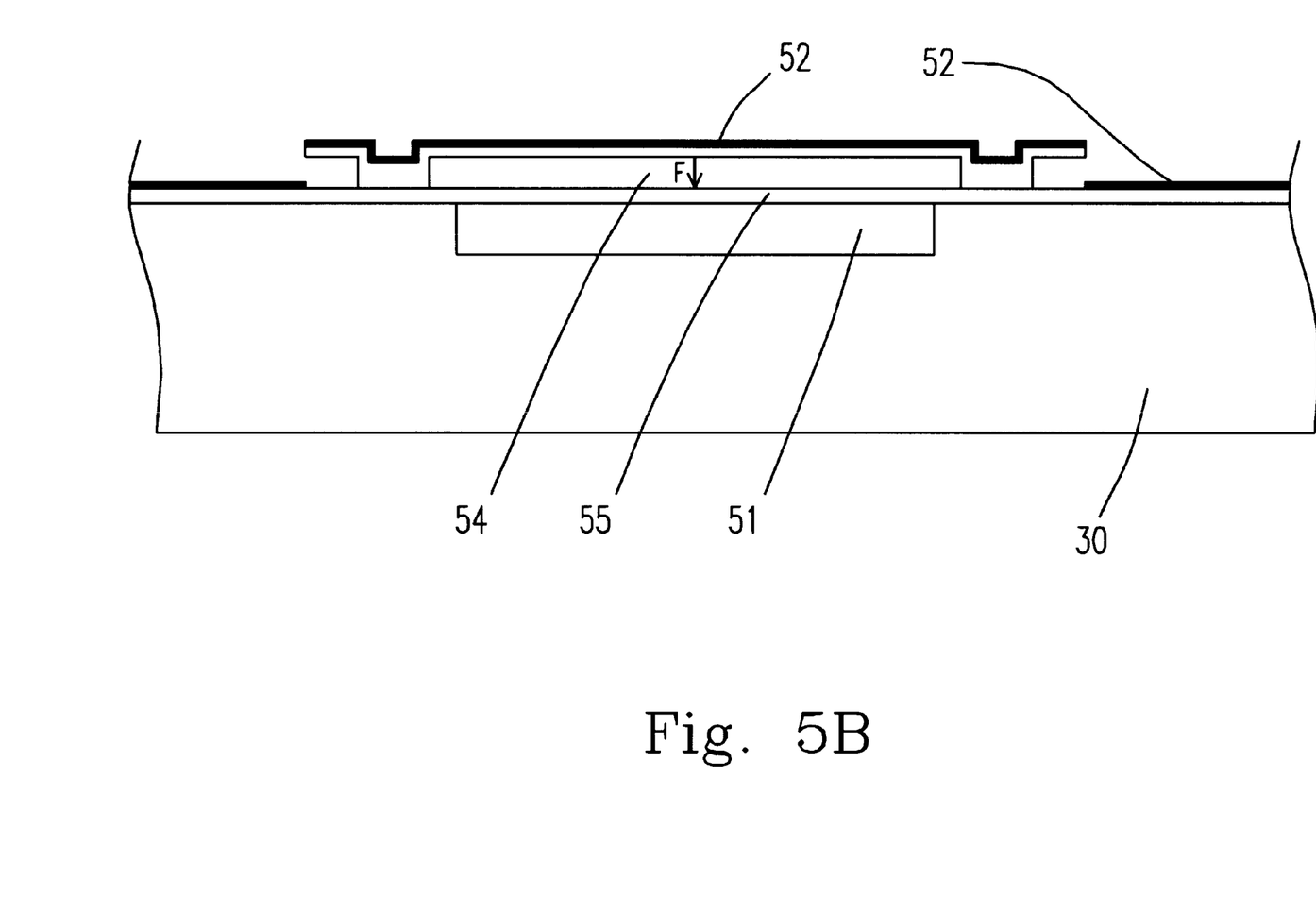
FIG. 5B is a cross-sectional view taken along the B–B' line of FIG. 5A for showing a preferred embodiment of an actuator included in the actuating mechanism of FIG. 5A.

Now, please refer to FIG. 5B which is a cross-sectional view taken along the B–B' line of FIG. 5A. Each of the actuators 321 and 322 includes a bottom electrode 51, a top electrode 52 and a power source 53 electrically connected to the bottom and top electrodes 51 and 52. The bottom electrode 51 is formed of a doped semiconductor material, e.g. highly doped p-type silicon, or any other suitable semiconductor material on the substrate 30. The top electrode 52 is formed of aluminum, platinum, gold or any other suitable conductive material. There are a gap 54 and an insulating layer 55 between the bottom and top electrodes 51 and 52. The power source 53 provides a potential difference so that an electrostatic force is generated between the bottom and top electrodes 51 and 52. Owing to the electrostatic attracting force F, the top electrode 52 moves toward the bottom electrode 51 so as to reduce the size of the gap 54. The insulating layer 55 is provided for preventing the bottom and top electrodes 51 and 52 from electric contact due to the reduction of the gap size.

Figure 5C:
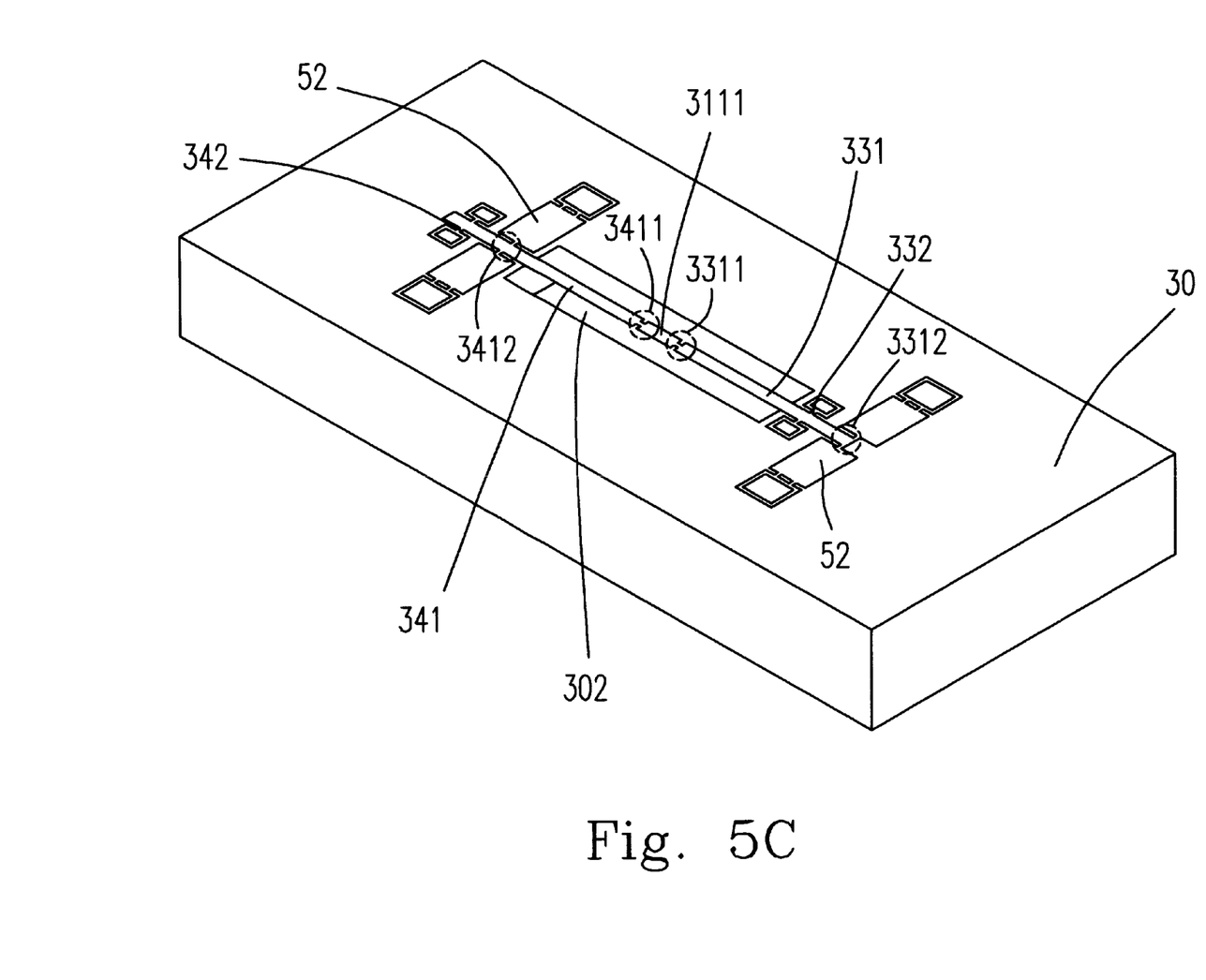
FIG. 5C schematically shows the connection of the linking rods to the actuator of FIG. 5B.
Figure 5D:
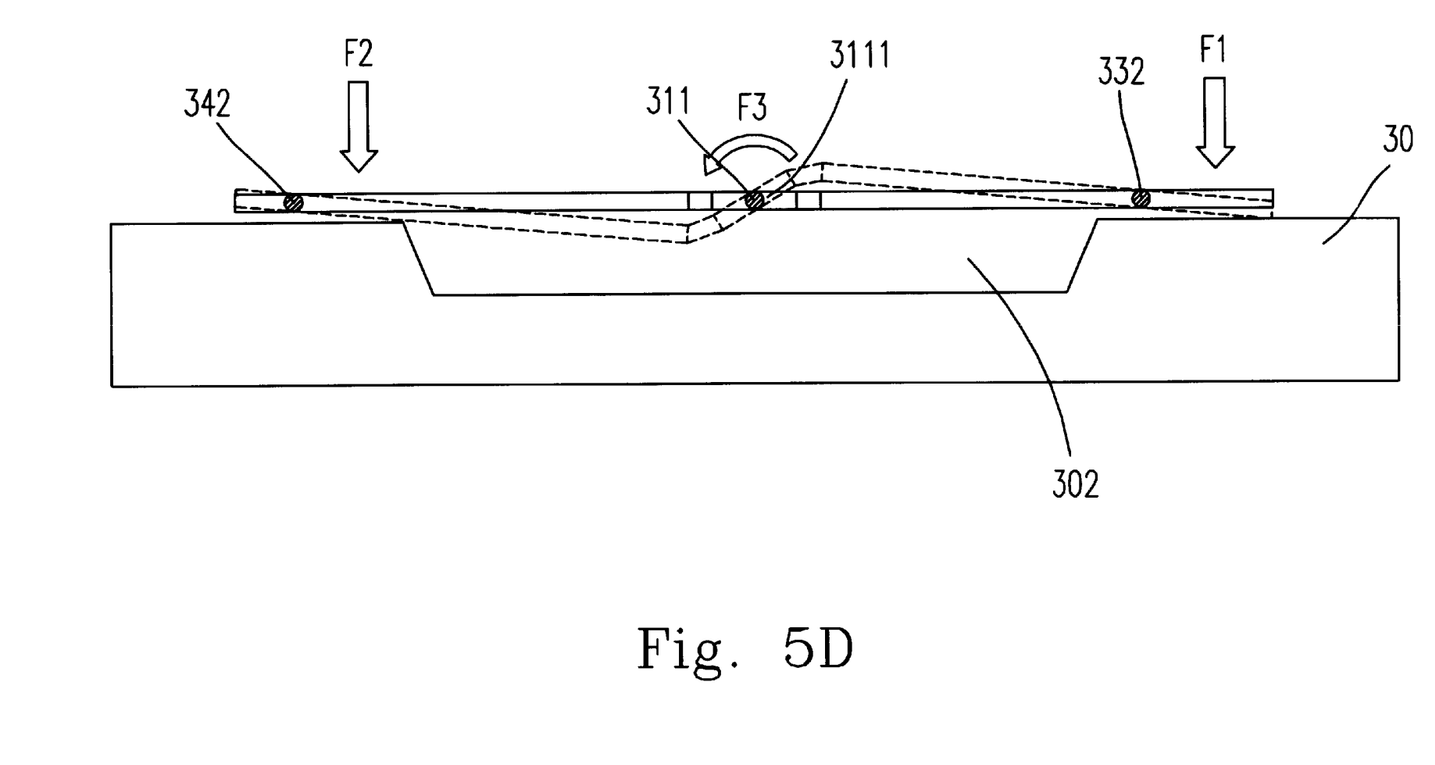
FIG. 5D schematically shows the operational principle of the actuating mechanism of FIGS. 5A~5C.

Further referring to FIG. 5C, the top electrode 52 of the first actuator 321 is connected to the second portion 3312 of the first linking rod 331, and the top electrode 52 of the second actuator 322 is connected to the fourth portion 3412 of the first linking rod 341. Therefore, with the movement of the top electrode 52 toward the bottom electrode 51, the second portion 3312 of the first linking rod 331 and the fourth portion 3412 of the first linking rod 341 move downwards, as indicated by the arrows F1 and F2 in FIG. 5D. Meanwhile, the first portion 3311 of the first linking rod 331 moves upwards owing to the presence of the first fulcrum 322, and the third portion 3411 of the second linking rod 341 moves downwards with the fourth portion 3412 so that the coupler 3111 is rotated in the second recess region 302 as indicated by the arrow F3 in FIG. 5D. Because the coupler 3111 is connected to the shaft 311, and the shaft is secured on the micro-mirror 31, the rotation of the coupler 3111 will drive the micro-mirror 31 to rotate in the first recess region 301.

It is understood from the above description, the linking rods 331 and 341 should be flexibly connected to the coupler 3111 to perform the above-mentioned operation. Therefore, it is preferred that the linking rods 331 and 341 are made of a material, e.g. silicon nitride, of low stress.

According to the present invention exemplified as above, a sufficient space 301 can be provided for the rotation of the micro-mirror 31 by arranging the actuating electrodes 321 and 322 beside the recess 301 rather than inside the recess.

Figure 6:
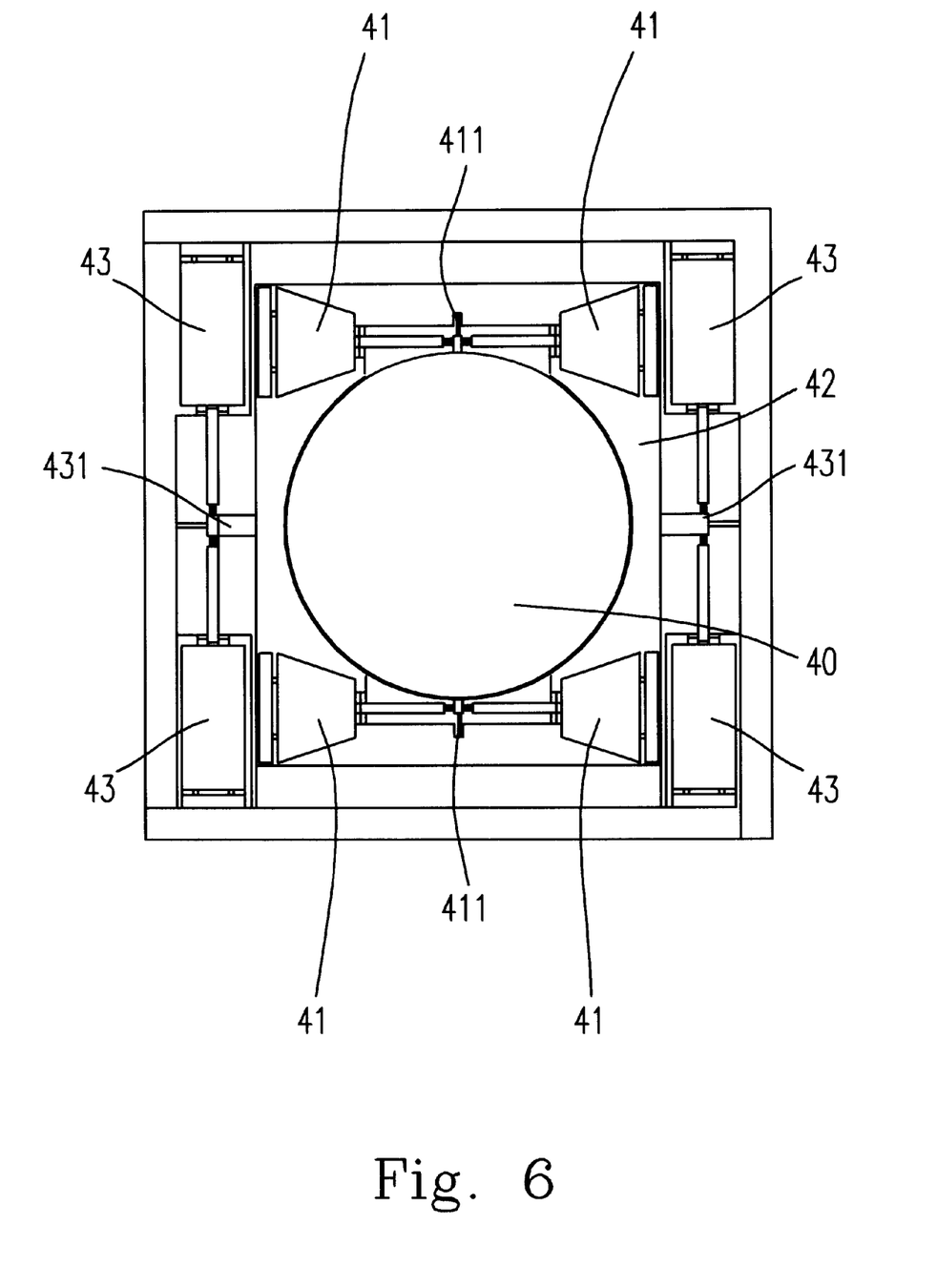
FIG. 6 is schematic diagram showing the application of an actuating mechanism according to the present invention for two-dimensional rotation of a micro-mirror.

If necessary, the actuating mechanism according to the present invention can be applied for two-dimensional rotation. Referring to FIG. 6, the micro-mirror 40 is rotated with a first shaft 411 by a first actuating mechanism 41, as mentioned above. The micro-mirror 40 and the first actuating mechanism 41 are mounted on a frame 42 which is further rotated with a second shaft 431 by a second actuating mechanism 43 similar to the first actuating mechanism 41.

Figure 7A:
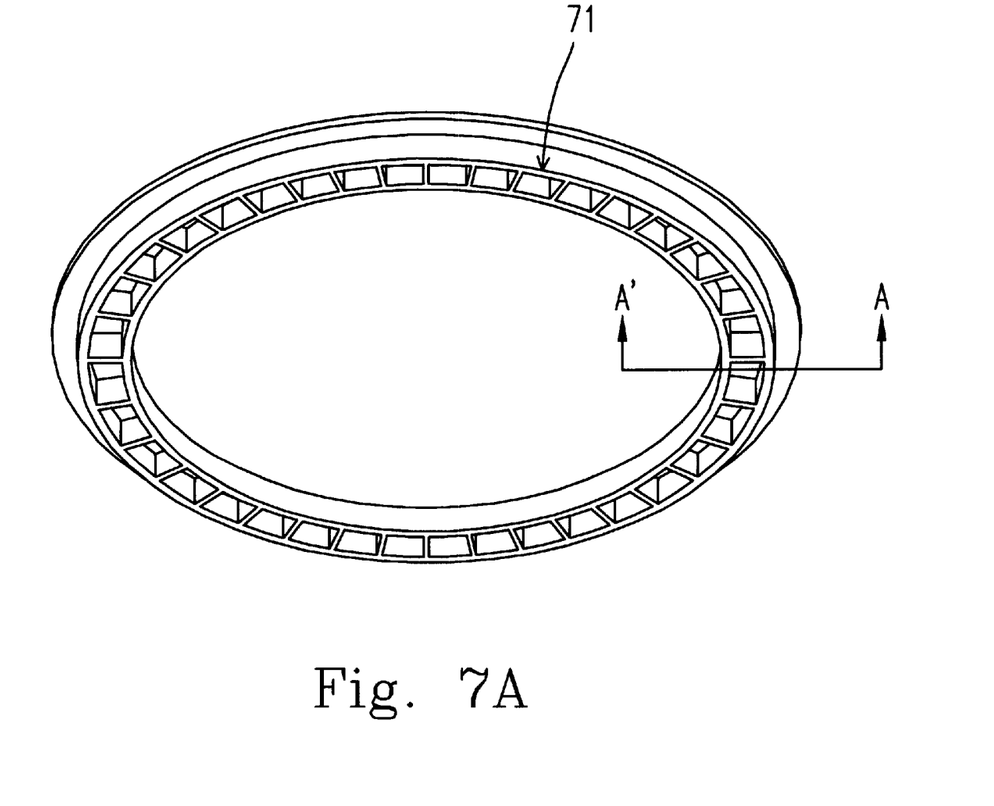
FIG. 7A is a schematic diagram showing a preferred structure of a micro-mirror to be rotated by the actuating mechanism according to the present invention; and, FIG. 7B is cross section taken along the A–A' line of FIG. 7A.
Figure 7B:
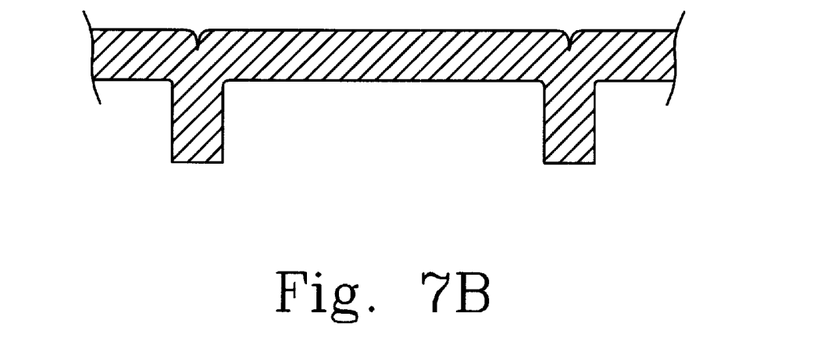

In the above-mentioned embodiment, the micro-mirror 31 or 40 is made of aluminum. Preferably, the micro-mirror is surrounded by a grid ring 71, as shown in FIGS. 7A and 7B wherein FIG. 7B is a cross section taken along the A–A' line of FIG. 7A, in order to strengthen the micro-mirror and avoid distortion resulting from frequent driven rotation.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An actuating mechanism for rotating a micro-mirror, comprising:

a substrate formed thereon a first recess region;

a shaft secured to said micro-mirror for rotating said micro-mirror therewith in said first recess region;

a first actuator mounted on said substrate beside said first recess region for providing a first actuating force;

a first linking rod device including a first linking rod and a first fulcrum positioned between a first and a second portions of said first linking rod, said first portion being flexibly connected to said shaft, and said second portion being coupled to said first actuator;

a second actuator mounted on said substrate beside said first recess region opposite to said first actuator for providing a second actuating force; and a second linking rod device including a second linking rod and a second fulcrum positioned at one end of said second linking rod, said second linking rod including a third portion flexibly connected to said shaft, and a fourth portion coupled to said second actuator;

wherein said second and fourth portions are moved in response to said first and second actuating forces to lever said first and third portions via said first and second fulcrums, respectively, thereby rotating said shaft.

2. The actuating mechanism according to claim 1 wherein said substrate is a silicon substrate.

3. The actuating mechanism according to claim 1 wherein said first actuator includes:

a bottom electrode formed on said substrate;

a top electrode connected to said second portion of said first linking rod, and formed above said bottom electrode with a gap therebetween; and a power source connected to said bottom and top electrodes for providing a potential difference in order to generate an electrostatic force between said bottom and top electrodes, thereby controlling the size of said gap, and moving said second portion of said first linking rod.

4. The actuating mechanism according to claim 3 wherein said bottom electrode is formed of a doped semiconductor material.

5. The actuating mechanism according to claim 3 wherein said top electrode is formed of a material selected from a group consisting of aluminum, platinum and gold.

6. The actuating mechanism according to claim 3 wherein said first actuator further includes an insulating structure between said bottom and top electrodes.

7. The actuating mechanism according to claim 1 wherein said second actuator includes:

a bottom electrode formed on said substrate;

a top electrode connected to said fourth portion of said second linking rod, and formed above said bottom electrode with a gap therebetween; and a power source connected to said bottom and top electrodes for providing a potential difference in order to generate an electrostatic force between said bottom and top electrodes, thereby controlling the size of said gap, and moving said fourth portion of said second linking rod.

8. The actuating mechanism according to claim 7 wherein said bottom electrode is formed of a doped semiconductor material.

9. The actuating mechanism according to claim 7 wherein said top electrode is formed of a material selected from a group consisting of aluminum, platinum and gold.

10. The actuating mechanism according to claim 7 wherein said second actuator further includes an insulating structure between said bottom and top electrodes.

11. The actuating mechanism according to claim 1 wherein said substrate is further formed thereon a second recess region to provide a movement space for said first and second linking rods.

12. The actuating mechanism according to claim 1 wherein said first and second linking rods are made of silicon nitride.

13. The actuating mechanism according to claim 1 wherein said shaft is coupled to both of said first portion of said first linking rod and said third portion of said second linking rod via a coupler.

14. The actuating mechanism according to claim 1 for rotating a micro-mirror made of aluminum.

15. The actuating mechanism according to claim 1 for rotating a micro-mirror with a grid ring therearound.

* * * * *